(12) United States Patent
Hoshino

(10) Patent No.: US 9,793,533 B2
(45) Date of Patent: Oct. 17, 2017

(54) MODULE BATTERY WITH MULTIPLE CELLS CONNECTED IN SERIES WITH FUSE AND METHOD OF MANUFACTURING MODULE BATTERY

(71) Applicant: NGK Insulators, Ltd., Nagoya-Shi (JP)

(72) Inventor: Koji Hoshino, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 7 days.

(21) Appl. No.: 14/639,480

(22) Filed: Mar. 5, 2015

(65) Prior Publication Data
US 2015/0180011 A1    Jun. 25, 2015

Related U.S. Application Data

(63) Continuation of application No. PCT/JP2013/075218, filed on Sep. 19, 2013.

(30) Foreign Application Priority Data

Sep. 25, 2012 (JP) .................. 2012-211210

(51) Int. Cl.
*H01M 2/34* (2006.01)
*H01M 10/42* (2006.01)
(Continued)

(52) U.S. Cl.
CPC ........... *H01M 2/34* (2013.01); *H01M 2/1077* (2013.01); *H01M 2/1088* (2013.01); *H01M 6/02* (2013.01);
(Continued)

(58) Field of Classification Search
CPC ...... H01M 2/34; H01M 10/4207; H01M 6/02; H01M 2/1077; H01M 2/1088;
(Continued)

(56) References Cited

U.S. PATENT DOCUMENTS

2003/0152830 A1* 8/2003 Eaves ................. H01M 10/425
429/156
2003/0186111 A1* 10/2003 Tamakoshi ........ H01M 10/3909
429/62
2008/0304199 A1* 12/2008 Cruise ............... H01M 10/4207
361/101

FOREIGN PATENT DOCUMENTS

DE     10 2007 047 652 A1    4/2009
DE     10 2009 058 561 A1    6/2011
(Continued)

OTHER PUBLICATIONS

International Search Report and Written Opinion (With English Translation), International Application No. PCT/JP2013/075218, dated Nov. 26, 2013 (6 pages).
(Continued)

*Primary Examiner* — Gary Harris
(74) *Attorney, Agent, or Firm* — Burr & Brown, PLLC

(57) ABSTRACT

Two or more strings are connected in parallel. The strings each include two or more cells and a fuse. The two or more cells are connected in series. The fuse is connected in series to the two or more cells. Combustion of the cells do not occur when heat generated per unit time by the cells is less than or equal to an upper limit. The number of series-connected cells is determined to be less than or equal to a threshold value, within which the electric power converted into heat by a short-circuited cell in the event of a failure reaches the upper limit. The fusing current matches with a charging current that flows to a fault string when the electric power converted into heat by a short-circuited cell in the event of a failure reaches the upper limit.

2 Claims, 13 Drawing Sheets

(51) Int. Cl.
*H01M 6/02* (2006.01)
*H01M 2/10* (2006.01)
*H01M 10/39* (2006.01)
*H02H 7/18* (2006.01)
*H02J 7/00* (2006.01)

(52) U.S. Cl.
CPC ... *H01M 10/3909* (2013.01); *H01M 10/4207* (2013.01); *H01M 2200/00* (2013.01); *H01M 2200/103* (2013.01); *H02H 7/18* (2013.01); *H02J 2007/0037* (2013.01); *Y10T 29/49004* (2015.01)

(58) Field of Classification Search
CPC ....... H01M 10/3909; H01M 2200/103; H01M 2200/00; H02H 7/18; H02J 2007/0037; Y10T 29/49004
USPC ............................................... 429/61; 29/593
See application file for complete search history.

(56) References Cited

FOREIGN PATENT DOCUMENTS

| | | |
|---|---|---|
| JP | 04-284351 A1 | 10/1992 |
| JP | 06-231748 | 8/1994 |
| JP | 08-17466 A | 1/1996 |
| JP | 2000-48865 A | 2/2000 |
| JP | 3177968 U | 8/2012 |

OTHER PUBLICATIONS

Isozaki, T., et al. "Development of Sodium-Sulfur Batteries," *NGK review of NGK Insulators, Ltd.*, No. 57A, dated Sep. 1998 (16 pages).

Extended European Search Report (Application No. 13841407.3) dated Apr. 1, 2016.

* cited by examiner

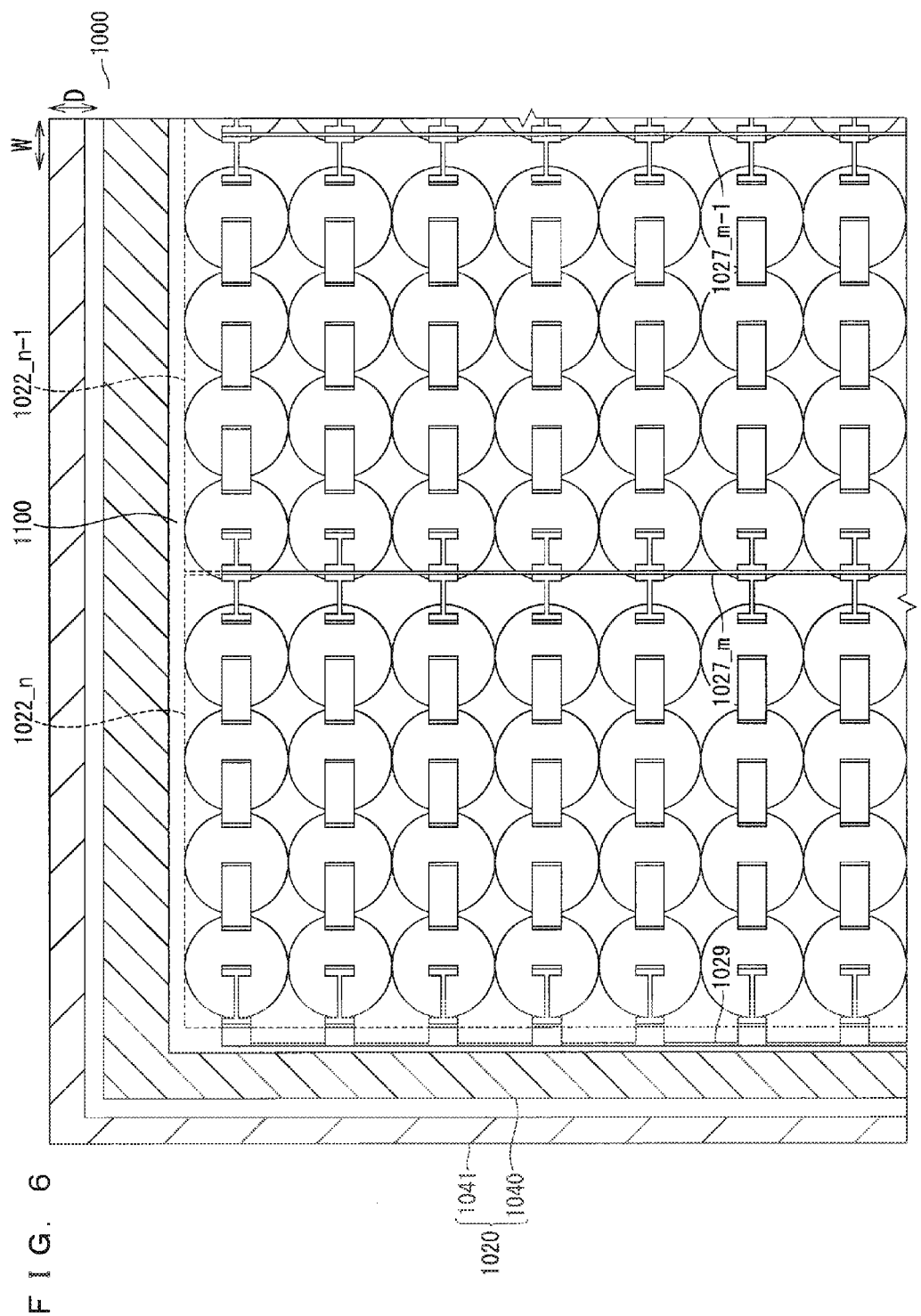
F I G. 6

F I G. 7
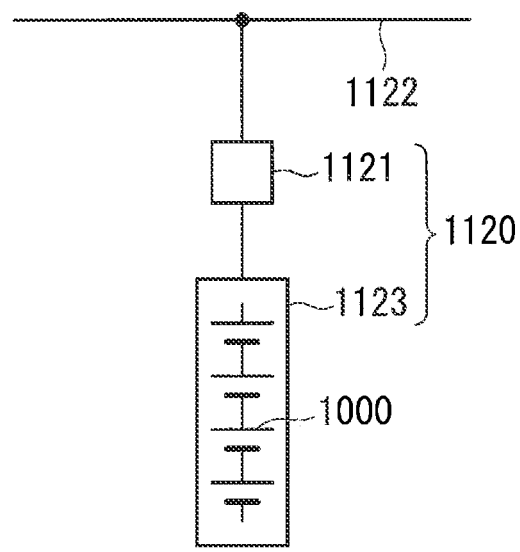

MODULE BATTERY WITH MULTIPLE CELLS CONNECTED IN SERIES WITH FUSE AND METHOD OF MANUFACTURING MODULE BATTERY

BACKGROUND OF THE INVENTION

1. Field of the Invention

The present invention relates to a module battery and a method of manufacturing the module battery.

2. Description of Related Art

Module batteries of sodium-sulfur batteries include a large number of cells connected in series and in parallel. For example, Patent Literature 1 discloses that two or more cells (electric cells 2) connected in series form a string, two or more strings connected in parallel via a parallel bus (parallel connection bus 8) form a block (electric cell group 16, 17, 18, or 19), and two or more blocks are connected in series. The two or more cells are connected in series to a fuse (fuse part 10b).

Non-Patent Literature 1 mentions a desirable range of the number of series-connected cells (electric cells). According to Non-Patent Literature 1, the number of series-connected cells is desirably in the range of 5 to 10 because a high charging current (overcharging follow current) will flow to a short-circuited cell when only a small number of cells are connected in series.

PRIOR ART LITERATURES

Patent Literature

Patent Literature 1: Japanese Patent Application Laid-open No. 6-231748

Non-Patent Literature

Non-Patent Literature 1: Takashi Isozaki and four others, "Development of Sodium-Sulfur Batteries," NGK review of NGK Insulators, Ltd., No. 57A (September 1998)

SUMMARY OF THE INVENTION

Problems to be Solved by the Invention

As mentioned in Non-Patent Literature 1, a high charging current will flow to a short-circuited cell when only a small number of cells are connected in series. A small number of series-connected cells can thus easily cause combustion of a short-circuited cell, compromising the safety of the module battery.

On the other hand, a large number of series-connected cells can cause wide variations in the states of charge of individual cells in a fully-charged condition. This inhibits efficient use of the capacities of the cells, reducing the energy density of the module battery. A large number of series-connected cells also increase the number of strings that cannot be used in the event of a failure of two or more cells, thus increasing the number of times that maintenance is required for the module battery.

In other words, conventional module batteries of sodium-sulfur batteries fail to achieve the following goals at the same time: ensuring safety, improving energy density, and reducing the number of times that maintenance is required. This problem is common to all module batteries other than those of sodium-sulfur batteries.

The present invention has been achieved in light of such a problem. An object of the present invention is to achieve the following goals at the same time: ensuring safety, improving energy density, and reducing the number of times that maintenance is required.

Means for Solving the Problems

First and second aspects of the present invention relate to a module battery.

In the first aspect of the present invention, two or more strings are connected in parallel. Each of the two or more strings includes two or more cells and a fuse. The two or more cells are connected in series, and the fuse is connected in series to the two or more cells.

The fuse is blown when a current higher than or equal to a fusing current flows.

Combustion of each of the two or more cells does not occur when heat generated per unit time by the cell is less than or equal to an upper limit.

A failure is defined as a case where the two or more strings include a fault string, and the two or more cells that belong to the fault string include a short-circuited cell.

The number of the two or more cells connected in series is determined to be less than or equal to a threshold value, within which electric power converted into heat by the short-circuited cell in the event of a failure reaches the upper limit.

The fusing current matches with a charging current that flows to the fault string when the electric power converted into heat by the short-circuited cell in the event of the failure reaches the upper limit.

The second aspect of the present invention provides an additional feature with the first aspect of the present invention. In the second aspect of the present invention, the fuse is a first fuse, and a second fuse is further provided. The first fuse is disposed further to a positive electrode side than the two or more cells. The second fuse is disposed further to a negative electrode side than the two or more cells. The second fuse is connected in series to the two or more cells and is blown when a current higher than or equal to the fusing current flows.

A third aspect of the present invention relates to a method of manufacturing the module battery.

In the third aspect of the present invention, the number of the two or more cells connected in series is determined, and the fusing current of the fuse is determined. The module battery is assembled in accordance with these determination results. The determination of the number of the two or more cells connected in series and the determination of the fusing current of the fuse are performed, following the description in the first aspect of the present invention.

Summary of the Invention

The present invention reduces variations in the states of charge of individual cells in a fully-charged condition, enables efficient use of the capacities of the cells, and improves the energy density of the module battery.

The present invention prevents the heat generated per unit time by the short-circuited cell from exceeding the upper limit and prevents combustion of the short-circuited cell, thus improving the safety of the module battery.

The prevent invention also inhibits an increase in the number of strings that cannot be used in the event of a failure of two or more cells, reducing the number of times that maintenance is required for the module battery.

According to the second aspect of the present invention, it is possible to reliably block a short-circuit current. This improves the safety of the module battery.

These and other objects, features, aspects and advantages of the present invention will become more apparent from the following detailed description of the present invention when taken in conjunction with the accompanying drawings.

BRIEF DESCRIPTION OF DRAWINGS

FIG. 6 is another horizontal cross-sectional view of the module battery.

FIG. 7 is a schematic diagram illustrating an example of use of the module battery.

DETAILED DESCRIPTION OF THE INVENTION (Overview)

A desirable embodiment described below relates to a module battery of sodium-sulfur batteries.

Figure 1:
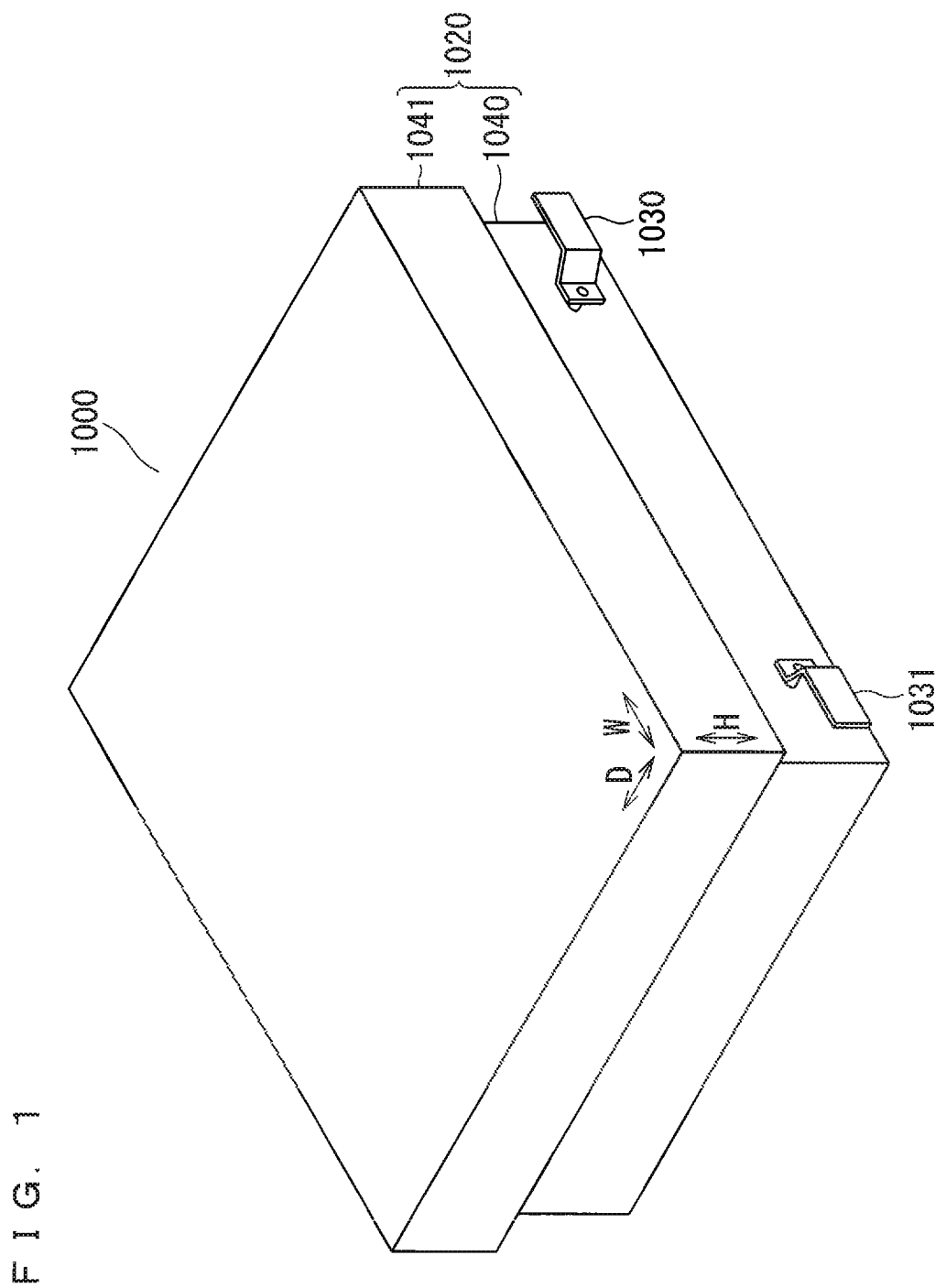
FIG. 1 is a perspective view of a module battery.
Figure 2:
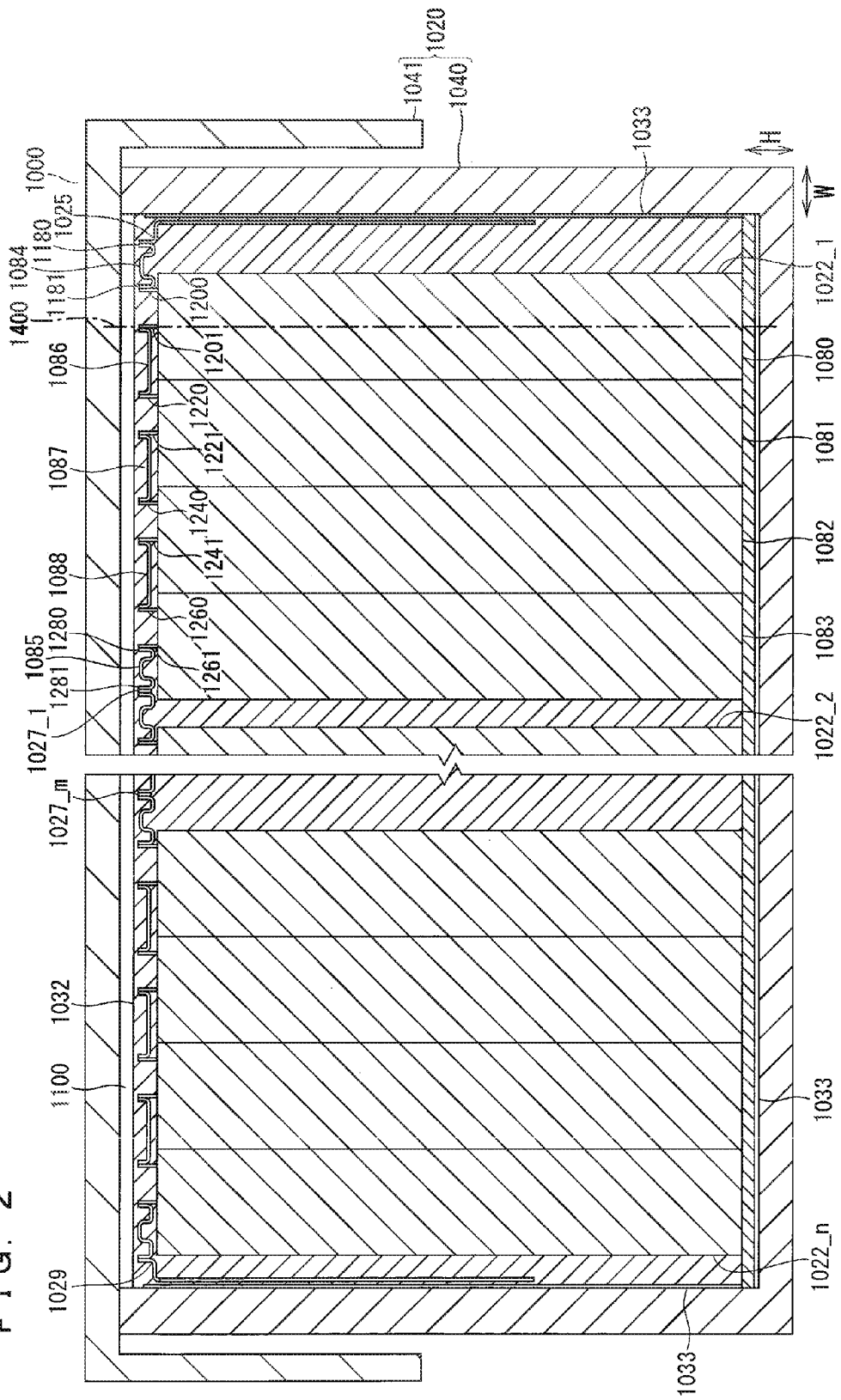
FIG. 2 is a vertical cross-sectional view of the module battery.

A schematic diagram of FIG. 1 is a perspective view of the module battery. A schematic diagram of FIG. 2 is a vertical cross-sectional view of the module battery. Schematic diagrams of FIGS. 3 to 6 are horizontal cross-sectional views of the module battery. FIGS. 3 to 6 illustrate the module battery excluding sand and a heater, which will be described later. FIGS. 3 to 6 respectively illustrate the right front side, left front side, right back side, and left back side of the module battery.

As illustrated in FIGS. 1 to 6, a module battery 1000 includes a case 1020, n string groups 1022_1, 1022_2, . . . , and 1022_n, a positive bus 1025, in parallel buses 1027_1, 1027_2, . . . , and 1027_m, a negative bus 1029, a positive bus bar 1030, a negative bus bar 1031, sand 1032, and a heater 1033. The number n of string groups included in the module battery 1000 is two or more. Alternatively, the number n of string groups included in the module battery 1000 may be one. The number m of parallel buses included in the module battery 1000 increases or decreases depending on the number n of string groups included in the module battery 1000.

The case 1020 includes a vacuum insulation container 1040 and an atmospheric insulation lid 1041.

Each of the n string groups 1022_1, 1022_2, . . . and 1022_n includes p strings 1060. The number p of strings 1060 included in each of the n string groups 1022_1, 1072_2, . . . , and 1022_n is two or more.

Each of the n×p strings 1060 includes a first cell 1080, a second cell 1081, a third cell 1082, a fourth cell 1083, a first fuse 1084, a second fuse 1085, a first cell connector 1086, a second cell connector 1087, and a third cell connector 1088. The number of cells included in each of the n×p strings 1060 may increase or decrease. More commonly, each of the n×p strings 1060 includes two or more cells.

The module battery 1000 may additionally include constituent elements other than those described above. There are also cases where some of the above-described constituent elements are omitted from the module battery 1000.

The case 1020 forms an accommodation space 1100. The n string groups 1022_1, 1022_2, . . . , and 1022_n, a major part of the positive bus 1025, the m parallel buses 1027_1, 1027_2, . . . , and 1027_m, a major part of the negative bus 1029, the sand 1032, and the heater 1033 are housed in the accommodation space 1100. Alternatively, the case 1020 may be replaced by another constituent element that is hard to be called a case, and such a constituent element also forms an accommodation space similar to the accommodation space 1100.

In the case of charging the module battery 1000, a charging current flows from the positive bus bar 1030 through the interior of the module battery 1000 to the negative bus bar 1031 so that the first cells 1080, the second cells 1081, the third cells 1082, and the fourth cells 1083 are charged.

In the case of discharging the module battery 1000, a discharge current flows from the negative bus bar 1031 through the interior of the module battery 1000 to the positive bus bar 1030 so that the first cells 1080, the second cells 1081, the third cells 1082, and the fourth cells 1083 are discharged.

If an excessive charging current flows to a string 1060 to which a short-circuited cell belongs, both or either of the first fuse 1084 and the second fuse 1085 are blown, and accordingly, no charging current flows to the string 1060 including the short-circuited cell. This inhibits combustion of the short-circuited cell.

The first cell 1080, the second cell 1081, the third cell 1082, and the fourth cell 1083 are all sodium-sulfur batteries. In the case of charging or discharging the module battery 1000, the temperature of the accommodation space 1100 is adjusted by the heater 1033 to a temperature at which the sodium-sulfur batteries operate. For example, the temperature of the accommodation space 1100 is adjusted to approximately 300° C. The sodium-sulfur batteries may be replaced by other types of secondary batteries.

(Example of Use of Module Battery)

A schematic diagram of FIG. 7 illustrates an example of use of the module battery.

As illustrated in FIG. 7, the module battery 1000 is typically used in a power storage device 1120. In the case of using the module battery 1000 in the power storage device 1120, two or more module batteries 1000 are connected in series, and a series-connected body 1123 that includes the two or more module batteries 1000 is connected to a power system 1122 via an AC-DC converter (PCS) 1121. It is also possible to use the module battery 1000 for other applications.

(Connection of Strings)

Figure 8:
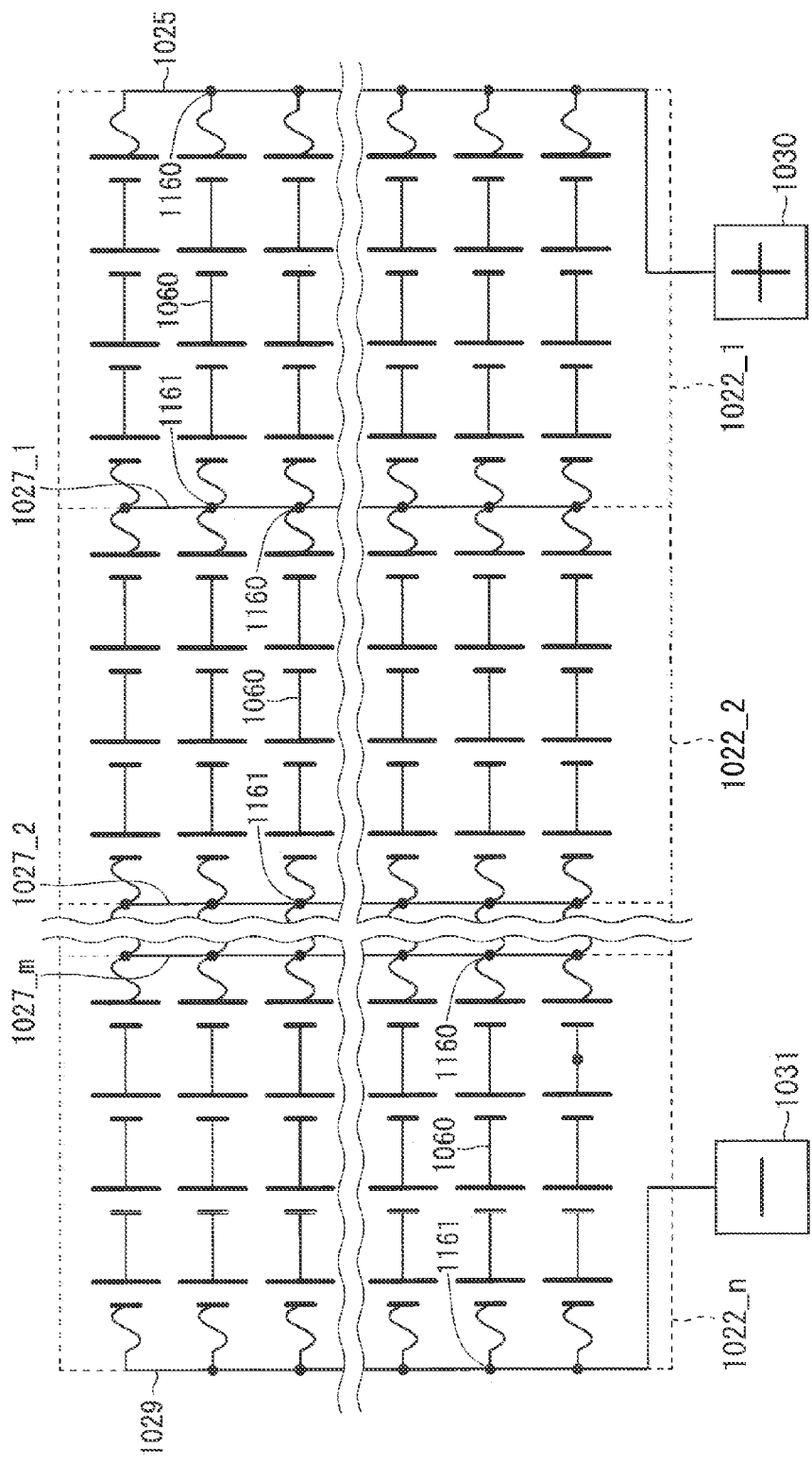
FIG. 8 is a circuit diagram of the module battery.

FIG. 8 is a circuit diagram of the module battery.

As illustrated in FIGS. 2 to 6 and FIG. 8, a positive terminal 1160 of each of the p strings 1060 that belong to first string group 1022_1 disposed furthest to the positive electrode side is connected to the positive bus 1025. A negative terminal 1161 of each of the p strings 1060 of the first string group 1022_1 is connected to the first parallel bus 1027_1. The p strings 1060 of the first string group 1022_1 are connected in parallel via the positive bus 1025 and the first parallel bus 1027_1, forming a first block. A current when flowing through the first block is divided into the p strings 1060 of the first string group 1022_1.

If an integer i is in the range of 2 to n-1, the positive terminal 1160 of each of the p strings 1060 that belong to the ith string group 1022_i is connected to the (i-1)th parallel bus 1027_i-1. The negative terminal 1161 of each of the p strings 1060 of the ith string group 1022_i is connected to the ith parallel bus 1027_i. The P strings 1060 of the ith string group 1022_i are connected in parallel via the (i-1)th parallel bus 1027_i-1 and the ith parallel bus 1027_i, forming the ith block. A current when flowing through the ith block is divided into the p strings 1060 of the ith string group 1022_i.

The positive terminal 1160 of each of the p strings 1060 that belong to the nth string group 1022_n disposed furthest to the negative electrode side is connected to the mth parallel bus 1027_m. The negative terminal 1161 of each of the p strings 1060 of the nth string group 1022_n is connected to the negative bus 1029. The p strings 1060 of the nth string group 1022_n are connected in parallel via the mth parallel bus 1027_m and the negative bus 1029, forming the nth block. A current when flowing through the nth block is divided into the p strings 1060 of the nth string group 1022_n.

(Connection of Buses)

Figure 3:
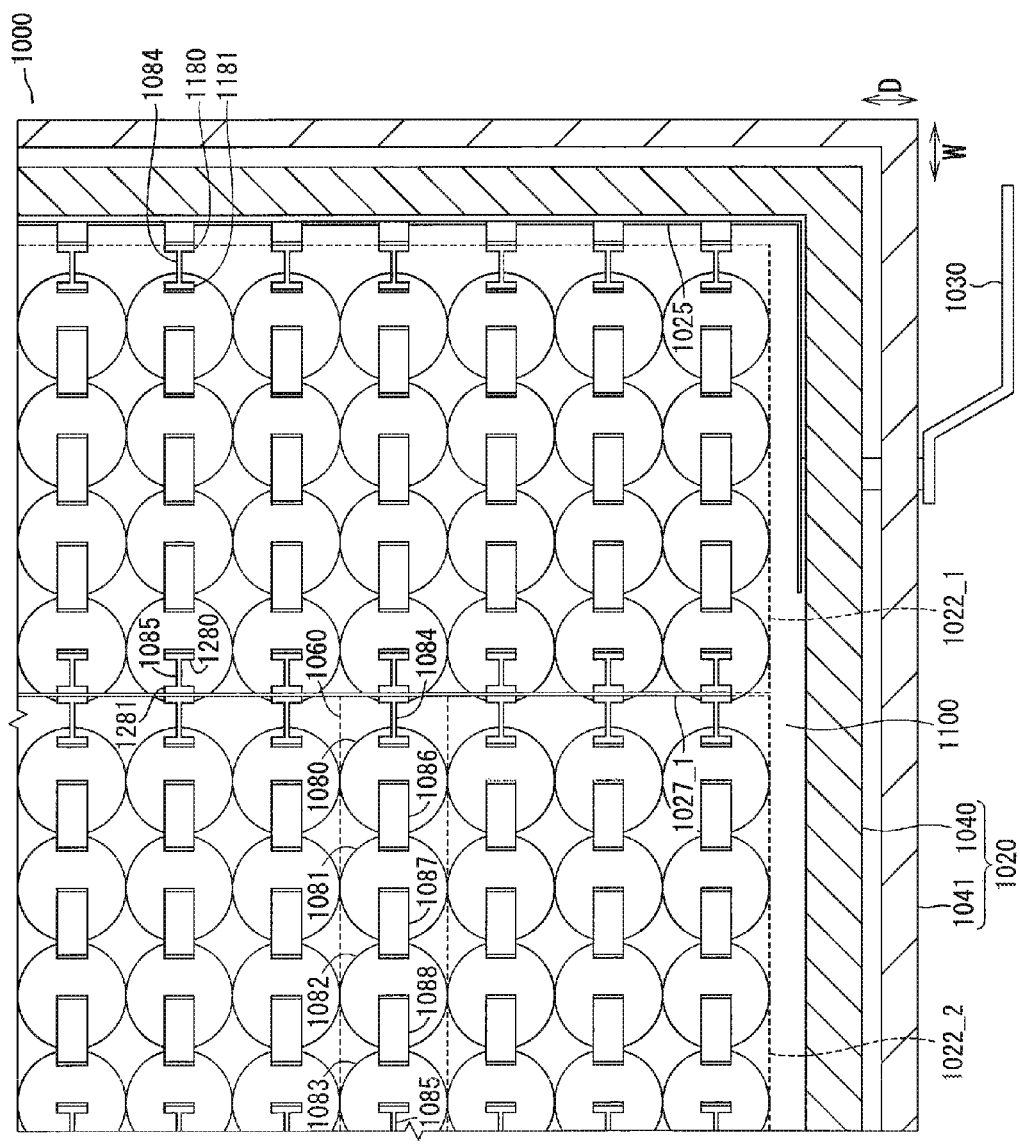
FIG. 3 is a horizontal cross-sectional view of the module battery.
Figure 4:
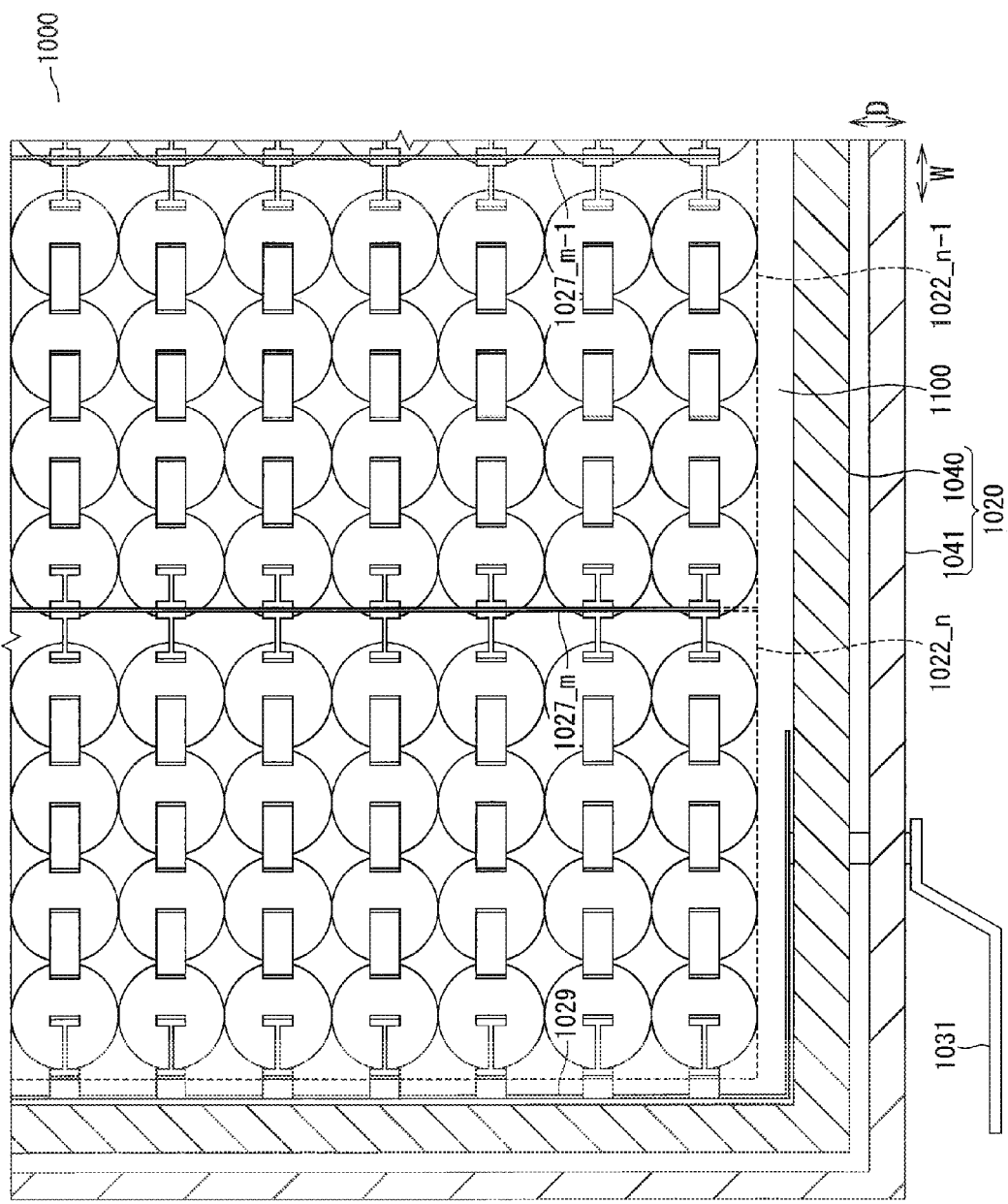
FIG. 4 is another horizontal cross-sectional view of the module battery.
Figure 5:
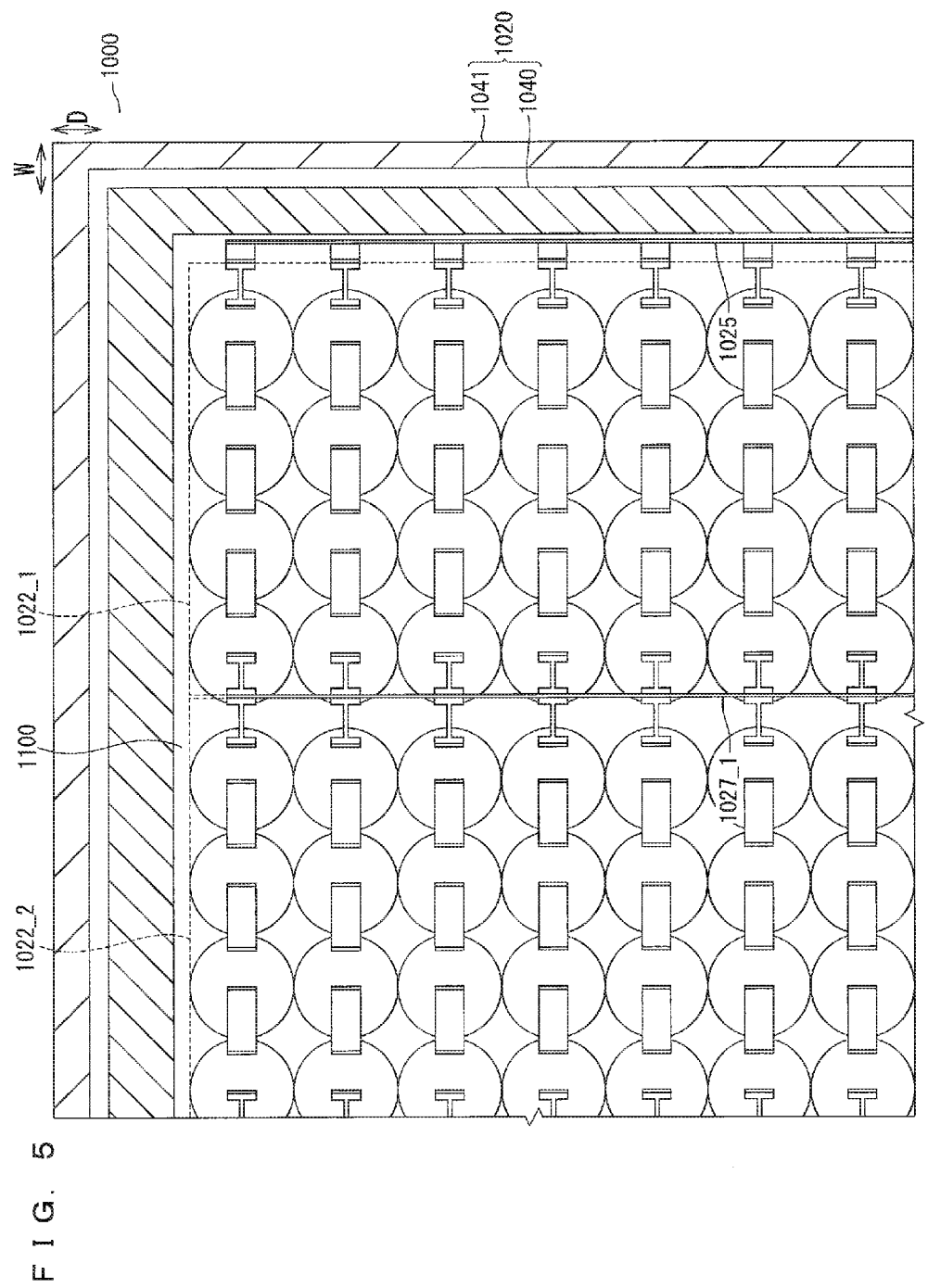
FIG. 5 is another horizontal cross-sectional view of the module battery.

As illustrated in FIGS. 3, 4, and 8, the positive bus bar 1030 is connected to the positive bus 1025, and the negative bus bar 1031 is connected to the negative bus 1029.

(Properties of Buses)

The buses including the positive bus 1025, the m parallel buses 1027_1, 1027_2, . . . , and 1027_m, the negative bus 1029, the positive bus bar 1030, and the negative bus bar 1031 are wiring structures having low electrical resistance, high mechanical strength, and high heat resistance, and they are typically plate-like or rod-like. Alternatively, all or some of the buses may be replaced by other types of wiring structures. For example, all or some of the buses may be replaced by cables.

The buses are desirably made of a metal or an alloy, more desirably, an aluminum alloy.

The connections between the strings 1060 and the buses and the connections of the buses are established by a method such as welding, swaging, or screwing that can resist high temperatures at which the sodium-sulfur batteries operate. This provides mechanical couplings between the strings 1060 and the buses and between the buses. The strings 1060 and the buses become electrically conducting, and the buses become electrically conducting.

(Connections within Strings)

Figure 9:
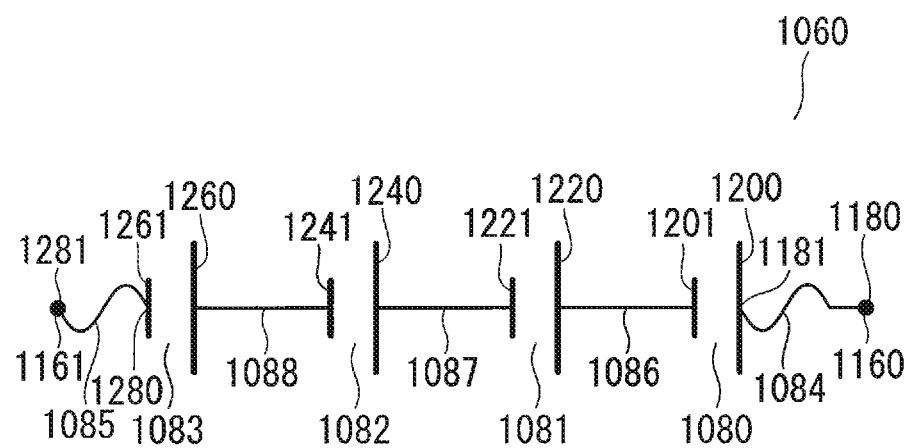
FIG. 9 is a circuit diagram of a string.

A circuit diagram of FIG. 9 illustrates a string.

As illustrated in FIGS. 2 to 6 and FIG. 9, one connection terminal 1181 of the first fuse 1084 is electrically connected to a positive terminal 1200 of the first cell 1080, which is disposed furthest to the positive electrode side. The other connection terminal 1180 of the first fuse 1084 forms the positive terminal 1160 of the string 1060.

A negative terminal 1201 of the first cell 1080 is electrically connected to a positive terminal 1220 of the second cell 1081 via the first cell connector 1086.

A negative terminal 1221 of the second cell 1081 is electrically connected to a positive terminal 1240 of the third cell 1082 via the second cell connector 1087.

A negative terminal 1241 of the third cell 1082 is electrically connected to a positive terminal 1260 of the fourth cell 1083 via the third cell connector 1088.

A negative terminal 1261 of the fourth cell 1083, which is disposed furthest to the negative electrode side, is electrically connected to one connection terminal 1280 of the second fuse 1085. The other connection terminal 1281 of the second fuse 1085 forms the negative terminal 1161 of the string 1060. The first cell 1080, the second cell 1081, the third cell 1082, and the fourth cell 1083 are connected in series, and the first fuse 1084 and the second fuse 1085 are connected in series to the first cell 1080, the second cell 1081, the third cell 1082, and the fourth cell 1083. A configuration is also possible in which all or some of the first cell connector 1086, the second cell connector 1087, and the third cell connector 1088 are excluded, and the positive terminal of each cell is directly connected to the negative terminal of another cell. The number of series-connected cells may increase or decrease within a limiting range, which will be described later.

A current flowing to the string 1060 flows to the first fuse 1084, the first cell 1080 the second cell 1081, the third cell 1082 the fourth cell 1083, and the second fuse 1085.

(Fusing Current of Fuses)

Each of the first fuse 1084 and the second fuse 1085 is blown when a current higher than a fusing current flows.

The fusing current is determined to prevent combustion of a short-circuited cell, which is caused by electric power converted into heat by the short-circuited cell, in the event of a failure of one of the two or more strings 1060. The first fuse 1084 and the second fuse 1085 can thus inhibit a flow of excessive charging current that can cause combustion of the short-circuited cell. This improves the safety of the module battery 1000.

(Upper limit of Heat Generated per Unit Time)

Combustion of each of the first cell 1080, the second cell 1081, the third cell 1082, and the fourth cell 1083 does not occur when the heat generated per unit time by the cell is less than or equal to an upper limit, but it may occur when the heat generated per unit time exceeds the upper limit.

Since the heat generated by the cells is Joule heat, the upper limit of the heat generated per unit time by the cells can also be the upper limit of the electric power converted into heat by the cells.

This electric power increases if charging is continued even after cells have been short-circuited. This is because electric power to be consumed by a short-circuit resistance is given by the product of a voltage applied to a cell and a current flowing to the cell, and this voltage is higher in the case of charging the cell than in the case of discharging the cell.

To prevent the combustion of cells, a failure is assumed in which the two or more strings 1060 include a fault string, and the first cell 1080, the second cell 1081, the third cell 1082, and the fourth cell 1083 that belong to the fault string include a short-circuited cell. The first fuse 1084 and the second fuse 1085 inhibit a charging current from flowing to the fault string, the charging current being higher than a charging current that flows to the fault string when electric power converted into heat by the short-circuited cell in the event of a failure (hereinafter, referred to as "follow-current power") reaches the upper limit. The fusing current of the first fuse 1084 and the second fuse 1085 matches with the charging current that flows to the fault string when the follow-current power reaches the upper limit.

This prevents the heat generated per unit time by the short-circuited cell from exceeding the upper limit and prevents combustion of the short-circuited cell, thus improving the safety of the module battery 1000. Additionally, the first fuse 1084 and the second fuse 1085 are not easily blown because of the ordinary operating current.

(Number of Series-Connected Cells)

When a large number of cells are connected in series, the number of cells that are not short-circuited but connected in series to a short-circuited cell increases, and the internal resistances of such non-short-circuited cells limit the charging current. Thus, the follow-current power decreases as the number of series-connected cells increases. The follow-current power can reach its upper limit value when the number of series-connected cells is less than or equal to a threshold value, but it cannot reach the upper limit when the number of series-connected cells is higher than the threshold value.

A large number of series-connected cells, however, causes wide variations in the voltage of the cells in a fully-charged condition, causing wide variations in the state of charge of the cells in a fully-charged condition. This prevents efficient use of the capacities of the cells, reducing the energy density of the module battery 1000.

In addition, a large number of series-connected cells tend to increase the number of strings that cannot be used in the event of a failure of two or more cells. This increases the number of times that maintenance is required for the module battery 1000.

To improve energy density and reduce the number of times maintenance is required, the number of series-connected cells is set to be less than a threshold value. The safety of the module battery is ensured by the first fuse 1084 and the second fuse 1085.

(Model for Computation of Follow-Current Power)

Figure 10:
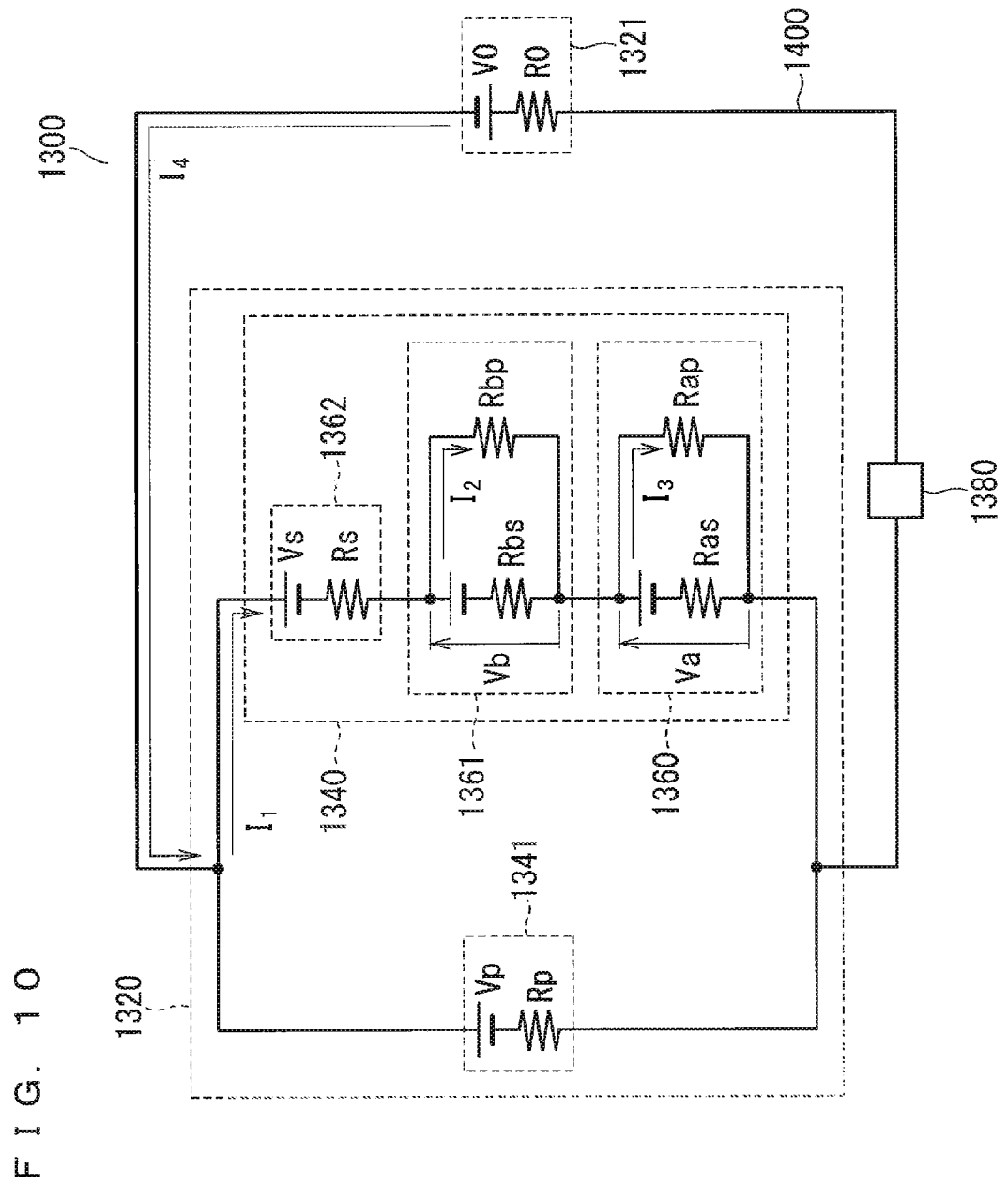
FIG. 10 is a circuit diagram of a model for computation of follow-current power.

A circuit diagram in FIG. 10 illustrates a model for computation of the follow-current power.

As illustrated in FIG. 10, in a model 1300 for computation of the follow-current power, one fault string 1340 that belongs to one block 1320 includes two short-circuited cells 1360 and 1361. The model 1300 for computation of the follow-current power models a case where n is the number of blocks, p is the number of parallel-connected strings, and s is the number of series-connected cells.

The one block 1320, a series-connected body 1321 of the remaining n-1 blocks, and a PCS 1380 are inserted into a charging/discharging path 1400 and the one block 1320, a series-connected body 1321 and a PCS 1380 are connected in series. The PCS 1380 is a supply source of the charging current.

The series-connected body 1321 is assumed to be a battery that has an open-circuit voltage V0 and an internal resistance R0.

In the block 1320, the one fault string 1340 and a parallell-connected body 1341 of the remaining p-1 strings are connected in parallel.

The parallell-connected body 1341 is assumed to be a battery that has an open-circuit voltage Vp and an internal resistance Rp.

In the fault string 1340, the first short-circuited cell 1360, the second short-circuited cell 1361, and a series-connected body 1362 of the remaining s-2 cells are connected in series.

The first short-circuited cell 1360 is short-circuited and has an internal resistance Ras and a short-circuit resistance Rap. In the case of charging the module battery 1000, a voltage Va is applied to the first short-circuited cell 1360, a charging current $I_1$ flows to the first short-circuited cell 1360, and a current $I_3$ flows to the short-circuit resistance Rap.

The second short-circuited cell 1361 is short-circuited and has an internal resistance Rbs and a short-circuit resistance Rbp. In the case of charging the module battery 1000, a voltage Vb is applied to the second short-circuited cell 1361, the charging current $I_1$ flows to the second short-circuited cell 1361, and a current $I_2$ flows to the short-circuit resistance Rbp.

(Example of Determination of Fusing Current)

Figure 11:
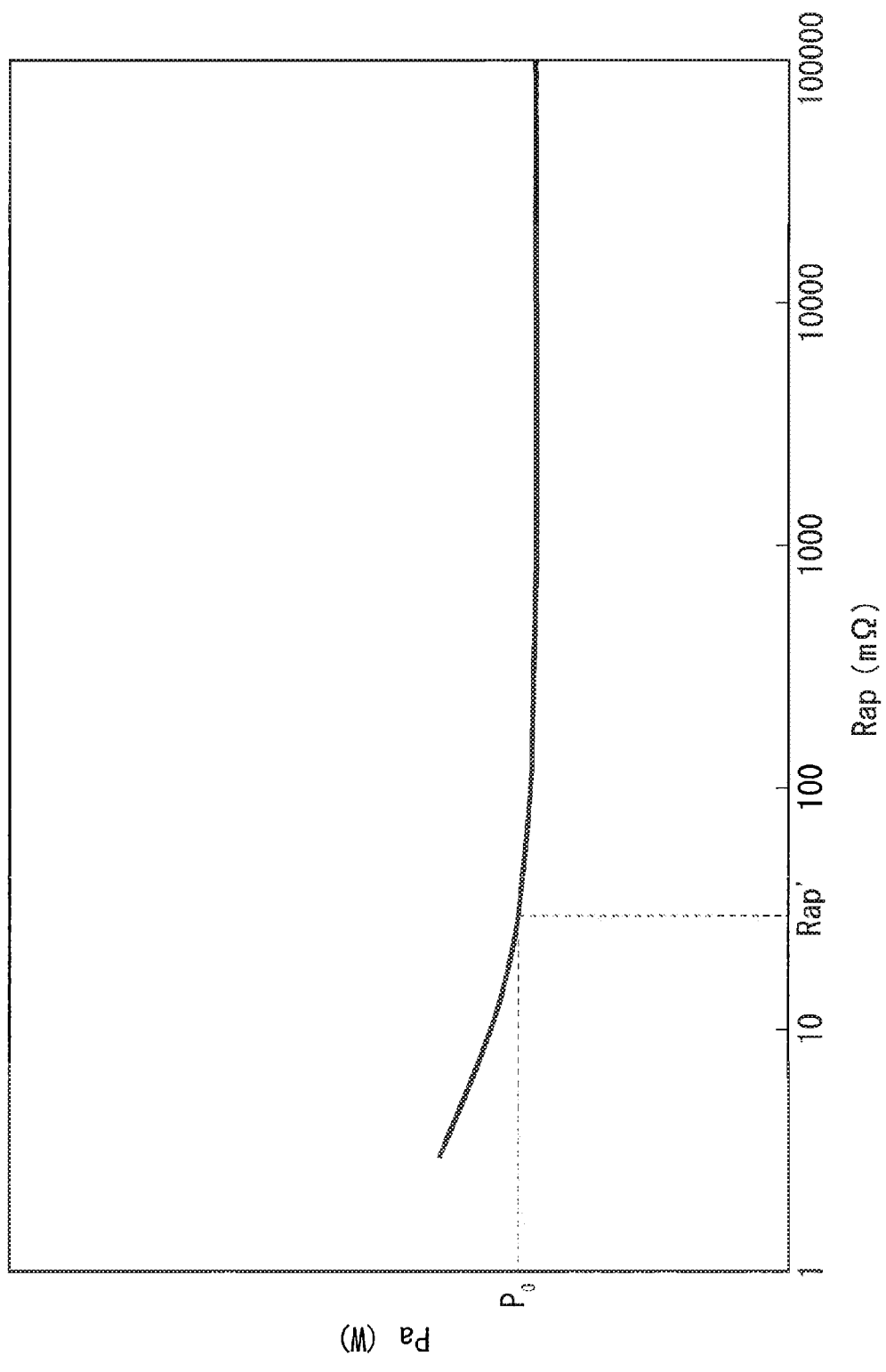
FIG. 11 is a graph illustrating a relationship between short-circuit resistance and follow-current power.

A graph in FIG. 11 illustrates a relationship between the short-circuit resistance Rap and follow-current power Pa. The relationship in FIG. 11 is calculated using the model for computation of the follow-current power.

FIG. 11 illustrates a relationship in the case where charging energy on the alternating-current side of the PCS 1380 is 30 kW, the open-circuit voltage of the first short-circuited cell 1360 is 2.075V, the internal resistance of the first short-circuited cell 1360 is 1.15 mΩ, the open-circuit voltage of the second short-circuited cell 1361 is 1.78V, the internal resistance of the second short-circuited cell 1361 is 1.15 mΩ, the short-circuit resistance of the second short-circuited cell 1361 is 10 mΩ, and the upper limit (hereinafter, referred to as a "follow-current limit") of the heat generated per unit time by the first short-circuited cell 1360 is $P_0$.

As illustrated in FIG. 11, the follow-current power Pa decreases with increasing short-circuit resistance Rap and becomes saturated.

To prevent combustion of the first short-circuited cell 1360, the follow-current power Pa is set to not exceed the follow-current limit $P_0$. For this purpose, FIG. 11 is referenced to identify a short-circuit resistance Rap' at which the follow-current power Pa reaches the follow-current limit $P_0$. FIG. 11 is also referenced to identify a current $I_0$ that is the charging current $I_1$ flowing when the first short-circuited cell 1360 has a short-circuit resistance Rap'. The charging current $I_1$ less than or equal to $I_0$ will not cause combustion of the first short-circuited cell 1360. The charging current $I_1$ higher than $I_0$ may cause combustion of the first short-circuited cell 1360. The fusing current is thus set to match with $I_0$.

(Example of Determination of the Number of Series-Connected Cells)

Figure 12:
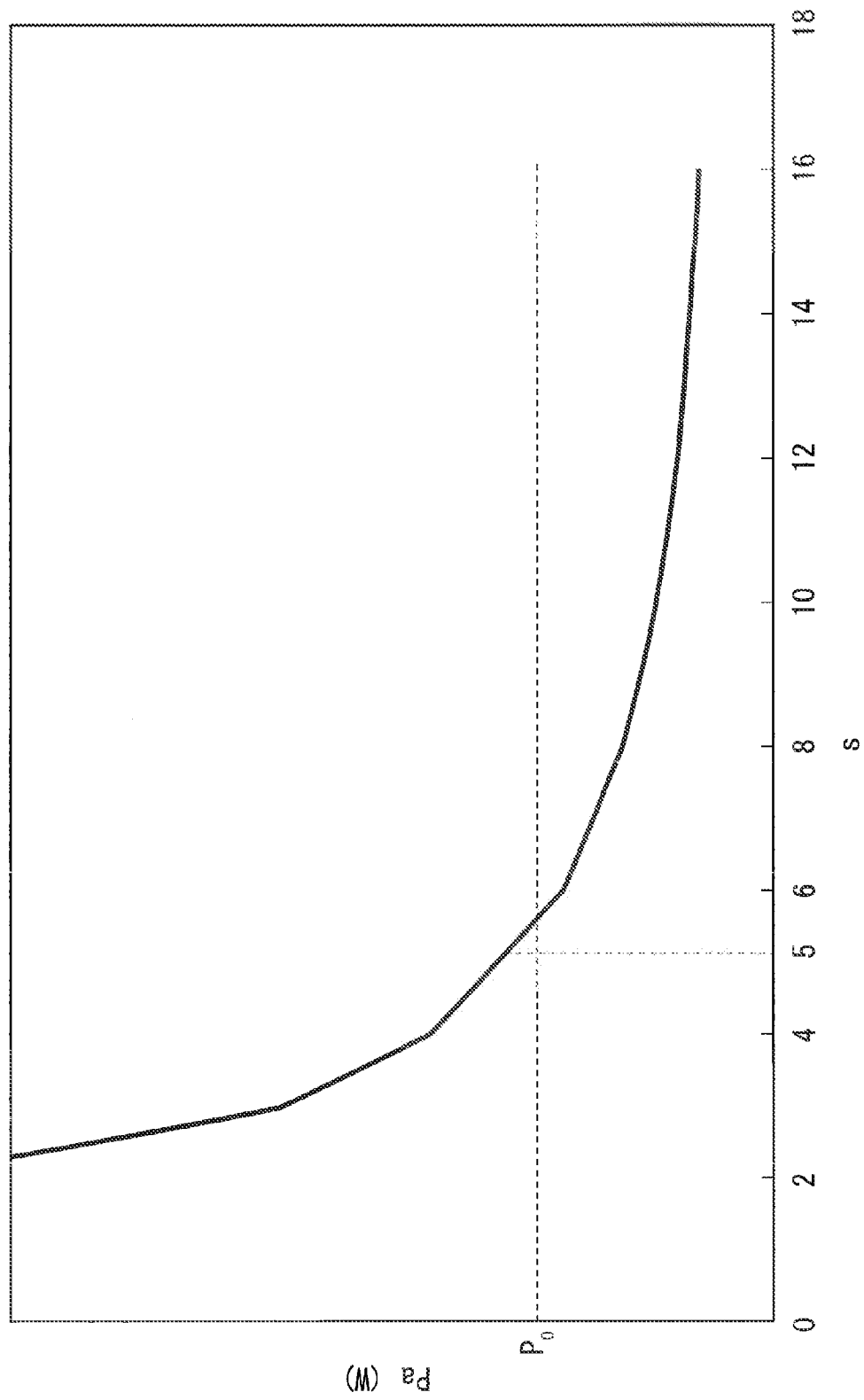
FIG. 12 is a graph illustrating a relationship between the number of series-connected cells and follow-current power.

A graph in FIG. 12 illustrates a relationship between the number s of series-connected cells and the follow-current power Pa. The relationship in FIG. 12 is calculated using the model for computation of the follow-current power. The follow-current power Pa illustrated in FIG. 12 is a maximum value obtained by changing the short-circuit resistance Rap.

As illustrated in FIG. 12, the follow-current power Pa decreases as the number s of series-connected cells increases. The follow-current power Pa reaches its follow-current limit $P_0$ when the number s of series-connected cells is five or less. For the module battery 1000, the number s of series-connected cells is determined to be four, which is less than or equal to the threshold value.

(Number of Parallel-Connected Strings)

The number of parallel-connected strings 1060 is desirably determined to enable efficient use of the capability of the PCS, which converts the charging current from AC to DC and converts the discharge current from DC to AC.

(Positions of Fuses)

As illustrated in FIG. 9, in each of the strings 1060, the first fuse 1084 is disposed further to the positive electrode side than the first cell 1080, the second cell 1081, the third cell 1082, and the fourth cell 1083, and the second fuse 1085 is disposed further to the negative electrode side than the first cell 1080, the second cell 1081, the third cell 1082, and the fourth cell 1083.

Figure 13:
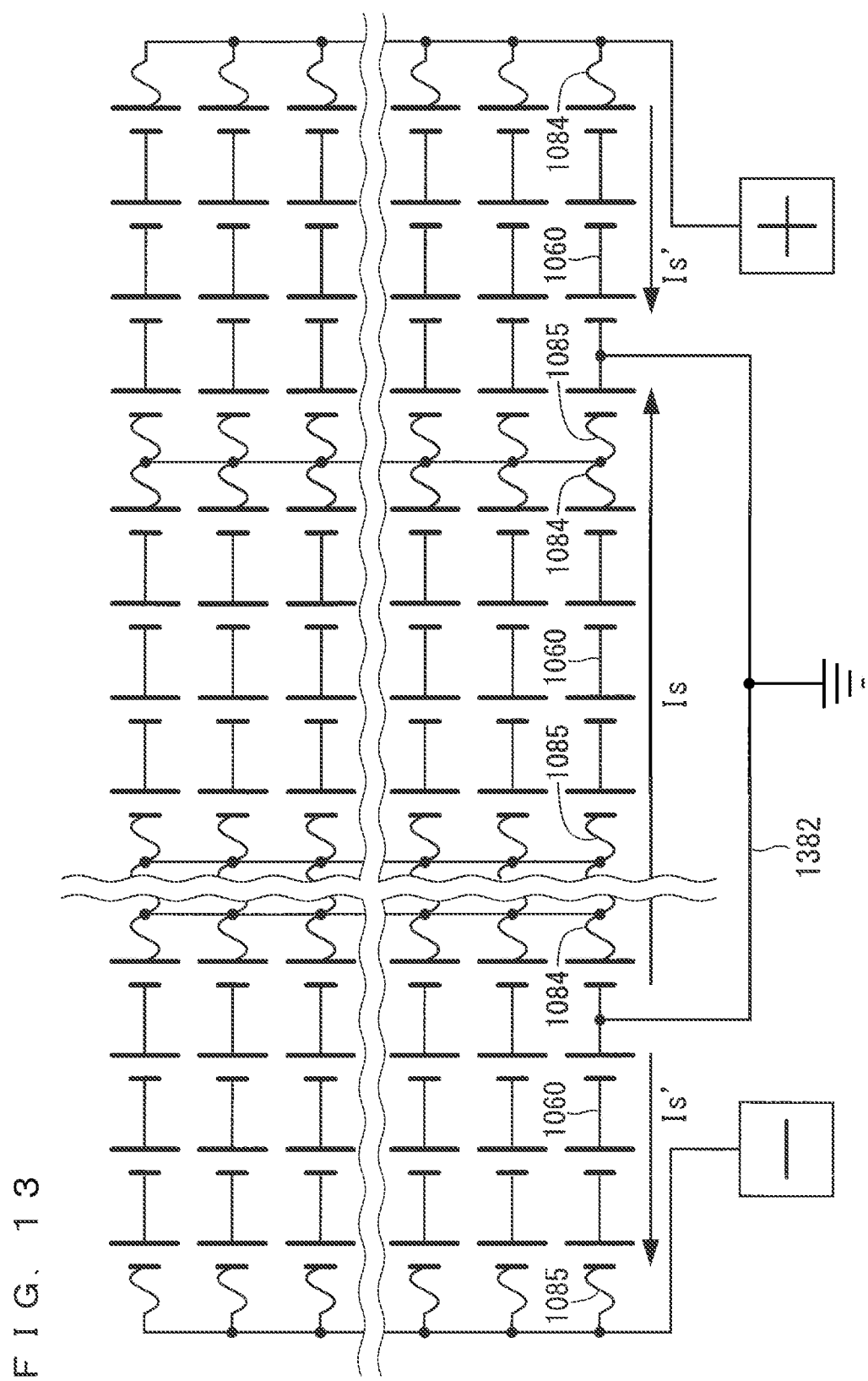
FIG. 13 is a circuit diagram of a module battery that includes a ground-fault circuit.

A circuit diagram in FIG. 13 illustrates a module battery that includes a ground-fault circuit.

As illustrated in FIG. 13, in a case where the first fuses 1084 and the second fuses 1085 are disposed thus, if two strings 1060 are electrically connected to the ground and forms a ground-fault circuit 1382, the first fuse 1084 that belongs to one of the strings 1060 and the second fuse 1085 that belongs to the other string 1060 inhibit a flow of short-circuit currents Is and Is'. Accordingly, the short-circuit currents Is and Is are interrupted more reliably and the safety of the module battery 1000 is improved.

Note that the aforementioned advantage of determining the fusing current and the number of series-connected cells can be ensured even if one of the first fuse 1084 and the second fuse 1085 is omitted or even if the positions of both or one of the first fuse 1084 and the second fuse 1085 are changed.

(Fuse Length)

As illustrated in FIGS. 2 to 6, each of the first cell 1080, the second cell 1081, the third cell 1082, and the fourth cell 1083 is a cylindrical cell that has a cylindrical axis 1400 and is vertically positioned. The positive terminals 1200, 1220, 1240, and 1260 are respectively not on the cylindrical axes 1400 of the first cell 1080, the second cell 1081, the third cell 1082, and the fourth cell 1083. The negative terminals 1201, 1221, 1241, and 1261 are respectively on the cylindrical axes 1400 of the first cell 1080, the second cell 1081, the third cell 1082, and the fourth cell 1083. The positive terminals 1200, 1220, 1240, and 1260 are respectively spaced from the negative terminals 1201, 1221, 1241, and 1261 in a width direction W of the module battery 1000. More commonly, the positive terminals 1200, 1220, 1240, and 1260 are respectively spaced from the negative terminals 1201, 1221, 1241, and 1261 in a first direction that is perpendicular to the cylindrical axes 1400.

In each of the strings 1600, the first fuse 1084, the first cell 1080, the second cell 1081, the third cell 1082, the fourth cell 1083, and the second fuse 1085 are arranged in the width direction W of the module battery 1000. More commonly, they are arranged in the first direction perpendicular to the cylindrical axes 1400.

In each of the n string groups 1022_1, 1022_2, . . . , and 1022_n, the strings 1060 are arranged in a depth direction D of the module battery 1000. More commonly, the strings 1060 are arranged in a second direction that is perpendicular to both the cylindrical axes 1400 and the aforementioned first direction.

The n string groups 1022_1, 1022_2, . . . , and 1022_n are arranged in the width direction W of the module battery 1000. More commonly, the n string groups 1022_1, 1022_2, . . . , and 1022_n are arranged in the first direction perpendicular to the cylindrical axes 1400.

The one connection terminal 1181 and the other connection terminal 1180 of the first fuse 1084 are spaced from each other by the fuse length of the first fuse 1084 in the width direction W of the module battery 1000. The one connection terminal 1280 and the other connection terminal 1281 of the second fuse 1085 are spaced from each other by the fuse length of the second fuse 1085 in the width direction W of the module battery 1000.

The fuse lengths of the first fuse 1084 and the second fuse 1085 are desirably short, approximately 44 mm long. This shortens the width direction W (first direction) of the module battery 1000, improving the energy density of the module battery 1000.

(Manufacture of Module Battery)

In the manufacture of the module battery, the number of series-connected cells and the fusing current are determined, following the above description. Then, the module battery 1000 is assembled in accordance with the determined number of series-connected cells and the determined fusing current.

While the invention has been shown and described in detail, the foregoing description is in all aspects illustrative and not restrictive. It is therefore to be understood that numerous modifications and variations can be devised without departing from the scope of the invention.

DESCRIPTION OF REFERENCE SIGNS

1000 Module battery
1022_1, 1022_2, . . . , 1022_n String group
1025 Positive bus
1027_1, 1027_2, . . . , 1027_m Parallel bus
1029 Negative bus
1060 String
1080 First cell
1081 Second cell
1082 Third cell
1083 Fourth cell
1084 First fuse
1085 Second fuse

The invention claimed is:

1. A module battery comprising:
two or more strings that are connected in parallel,
each of said two or more strings including:
two or more cells that are connected only in series, said two or more cells being sodium-sulfur batteries; and
a fuse that is connected in series to said two or more cells and that is blown when a current higher than or equal to a fusing current flows,
wherein combustion of each of said two or more cells does not occur when heat generated per unit time by the cell is less than or equal to an upper limit,
a failure is defined as a case where said two or more strings include a fault string, and said two or more cells that belong to said fault string include a short-circuited cell,
the number of said two or more cells that are connected in series is determined to be less than or equal to a threshold value, within which electric power converted into heat by said short-circuited cell in the event of said failure reaches said upper limit, and
said fusing current matches with a charging current that flows to said fault string when the electric power converted into heat by said short-circuited cell in the event of said failure reaches said upper limit.

2. The module battery according to claim 1, wherein
said fuse is a first fuse that is disposed further to a positive electrode side than said two or more cells, and
each of said two or more strings further includes:
a second fuse that is connected in series to said two or more cells, is blown when a current higher than or equal to said fusing current flows, and is disposed further to a negative electrode side than said two or more cells.

* * * * *